June 20, 1939.  B. H. ENGLAND  2,162,803
FLUID CLUTCH AND TURBO-TORQUE CONVERTER
Filed Feb. 29, 1936  3 Sheets-Sheet 1

INVENTOR
BASIL H. ENGLAND
BY
ATTORNEY.

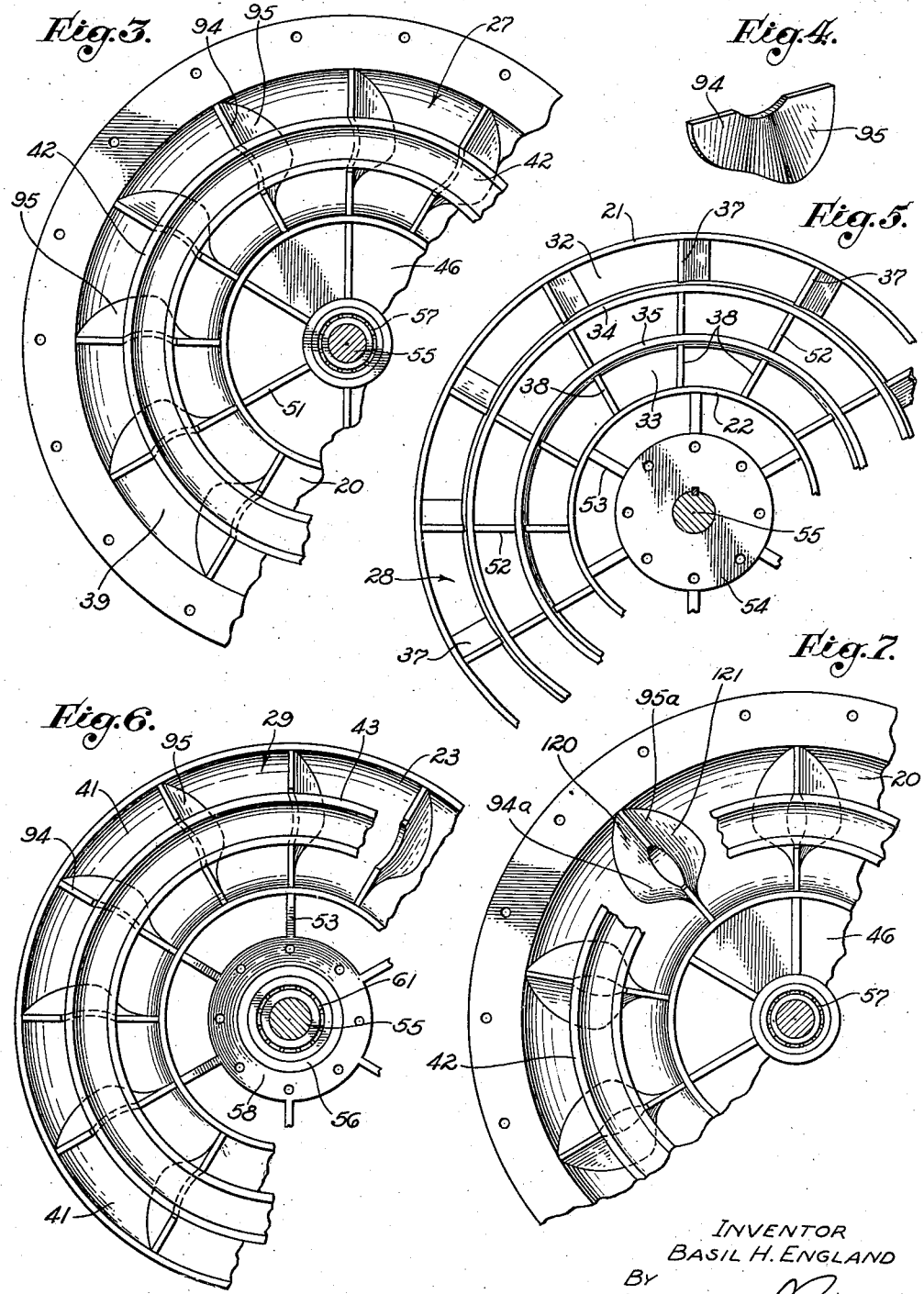

June 20, 1939.　　　　　B. H. ENGLAND　　　　　2,162,803
FLUID CLUTCH AND TURBO-TORQUE CONVERTER
Filed Feb. 29, 1936　　　3 Sheets—Sheet 3
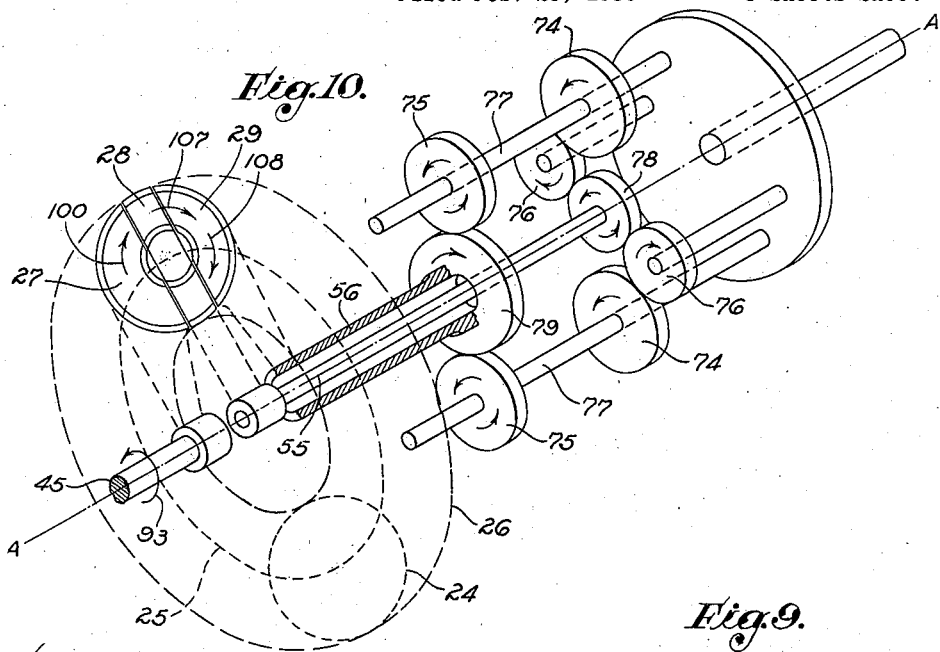
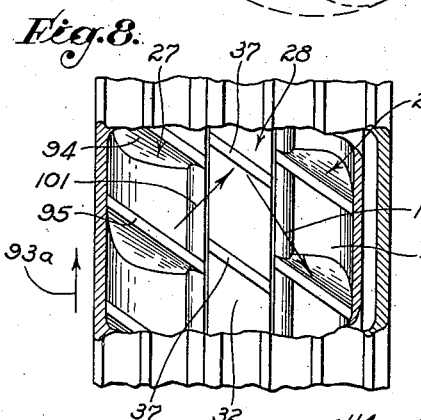
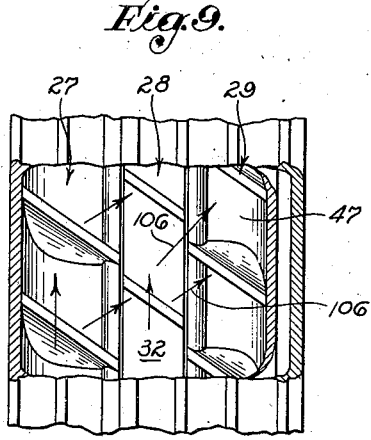
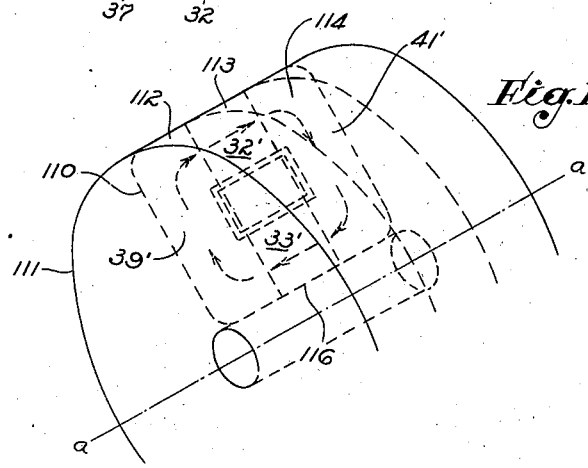
INVENTOR
BASIL H. ENGLAND
BY
ATTORNEY.

Patented June 20, 1939

2,162,803

UNITED STATES PATENT OFFICE 2,162,803

FLUID CLUTCH AND TURBO-TORQUE CONVERTER

Basil H. England, Southsea, England

Application February 29, 1936, Serial No. 66,405

7 Claims. (Cl. 74—189.5)

My invention relates to power transmitting devices wherein a liquid moved by one member produces a movement of another member, and relates in particular to a device of this character having as a principal element a toroid or toroidal member which is divided into a plurality of sections by parallel planes which are disposed normal to the axis around which the toroid or toroidal member is generated.

It is an object of the invention is to provide a device of this character which will operate at different speeds and at different loads, enabling the transmission of power through a range from high-torque low-velocity rotation of a driven member to low-torque high-velocity rotation of the driven member.

The present invention is intended for use in some conditions of power application to replace friction or jaw types of clutches such as are now extensively employed. Among the objects of the present invention are to provide a device which will absorb crank-shaft vibrations instead of transmitting them to the driven mechanism or device; to provide a device which will isolate the motor or engine from the driven device so as to eliminate the transmission of shocks between these members; to avoid the burning out of clutches by the elimination of frictionally engaging clutch members; to avoid the need for torque-speed gear change devices; and to avoid the possibility of overloading either the power equipment or the driven equipment.

It is an object of the invention to provide a device of this character having an intermediate section of annular form provided with outer passages and inner passages which are directed substantially parallel to the axis of rotation of the annular member, and front and rear sections of annular form, each having passages formed therein so as to connect the ends of the inner and outer passages of the intermediate section, all of the passages in the three sections cooperating to form essentially closed circuits through which a transmission fluid may flow during the operation of the device.

It is a further object of the invention to provide a device of the character described in the preceding paragraph wherein the passages are separated by walls or vanes disposed in such relation that the circulating transmission fluid will act and react against these walls or vanes in such a manner as to produce rotation of the intermediate and rear sections in response to rotation of the front section of the device.

It is a further object of the invention to provide a device such as set forth hereinabove having differential gear means connecting the intermediate and rear sections so that the rotation of these intermediate and rear sections will impart a differential rotation to the differential gear mechanism which is in turn connected to a driven member in a maner to rotate the same. In the practice of the invention the gear mechanism may be contained in a casing associated directly with the casing enclosing the front, intermediate, and rear sections, or may be in a separate casing.

Further objects and advantages of the invention will be made evident throughout the following part of the specification.

Referring to the drawings, which are for illustrative purposes only,

Fig. 3 is a fragmentary view of the inner face of the front section of the device.

Fig. 4 is a perspective view of one of the vane members employed in the front section and also in the rear section.

Fig. 5 is a fragmentary view looking toward the front face of the intermediate section of the device.

Fig. 6 is a fragmentary view looking toward the front face of the rear section of the device.

Fig. 7 is a fragmentary view similar to Fig. 3, showing an alternative form of vane structure.

Fig. 8 is a fragmentary view of the hydraulic element of the device, with a portion of the outer wall or casing cut away to disclose the angular relation of the peripheral or outer portions of the vanes in the three hydraulic sections.

Fig. 9 is a fragmentary view similar to Fig. 8, illustrating the theoretical application of forces when both the front and the intermediate sections are rotating forwardly at relatively high velocity.

Fig. 10 is a perspective diagrammatic view wherein the essential elements of the device are shown.

Fig. 11 is a schematic view for illustrating the meaning of the words "toroid" and "curved passages" as employed in this specification.

Figure 1:
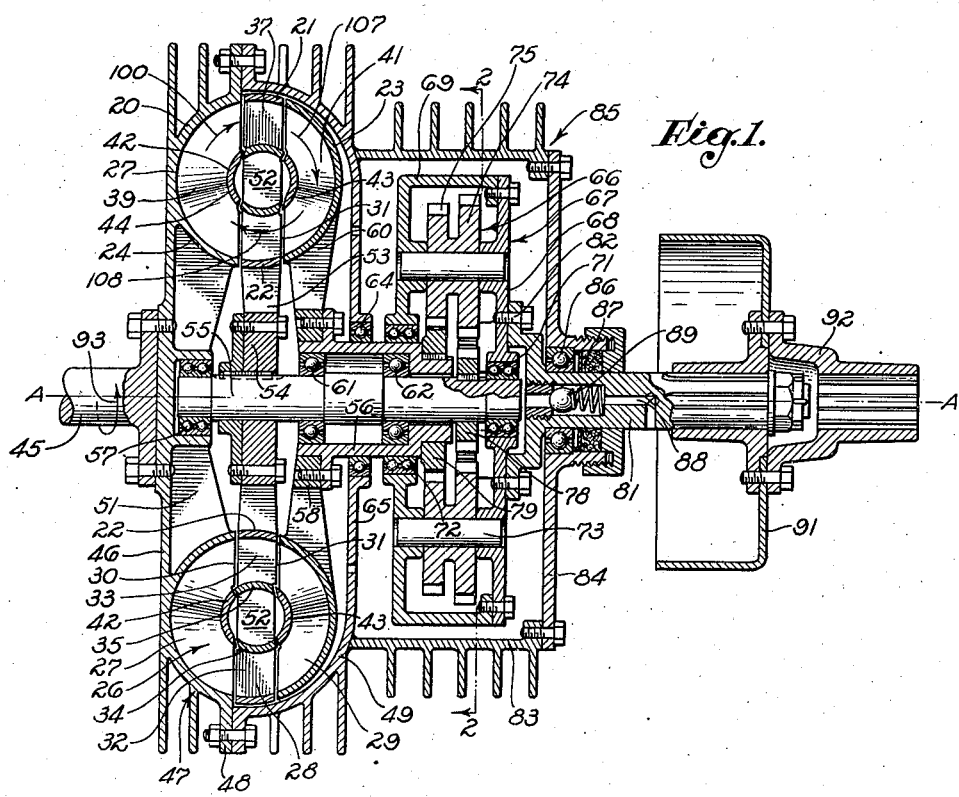
Fig. 1 is a vertically sectioned view of a preferred embodiment of my invention.
Figure 2:
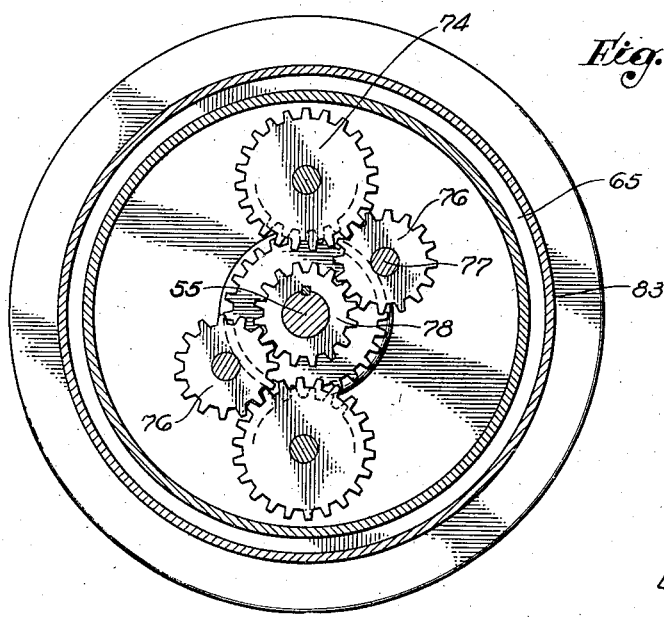
Fig. 2 is a cross section on a plane represented by the line 2—2 of Fig. 1.

In Fig. 1 I show walls 20 and 23 which are slightly less than semi-circular in cross section, and arcuate walls 21 and 22 disposed between the walls 20 and 23 in such a manner that the cross-sectional presentation of these walls 20 to 23 inclusive defines a circle 24 which is likewise indicated in dotted lines in Fig. 10. The circle 24 lies in a plane coinciding with the axis A—A, and when it moves around this axis A—A in a circle 25, Fig. 10, a toroid 26 is generated. The walls 20 to 23 inclusive are likewise generated around the axis A—A of Fig. 1, and since these walls 20 to 23 define a circle 24, they likewise define a toroid 26.

The toroid is divided into three sections, namely, a front section 27, an intermediate section 28, and a rear section 29. In the preferred practice of the invention the lines of division 30 and 31 between the sections 27, 28, and 29 lie in planes which are normal to the axis A—A.

In the explanation of the invention, I use that definition of the term "toroid" which means a volume defined by generation of a circular area around an axis lying in its own plane; therefore, the sections 27, 28, and 29 are each annular or ring-like volumes which when placed together as shown in Fig. 1 constitute a volumetric toroid. In the intermediate section 28, just within the peripheral wall 21, outer passages 32 are formed, and around the wall 22 of the intermediate section 28 inner passages 33 are formed. The inner passages 33 and the outer passages 32 extend through the intermediate section 28 from the front or leftward face thereof to the rear or rightward face thereof. The inner boundaries of the outer passages 32 are defined by a wall 34 of arcuate cross section, and the outer boundaries of the inner passages 33 are defined by a wall 35 of arcuate cross section, as shown in Fig. 5.

As shown in Figs. 1, 5, and 8, the outer passages 32 are separated by walls or webs 37 which are helical with relation to the axis A—A. The inner passages 33, as shown in Figs. 1 and 5, are separated by walls or webs 38 which are preferably so formed that they are not helical but define radial planes coinciding with the axis A—A.

The front section 27 of the toroid 26 has a plurality of passages 39 which are curved so that they will connect the front ends of the passages 33 with the front ends of the passages 32 of the intermediate section 28. Similarly, the rear section 29 of the toroid 26 has passages 41 therein which are curved so as to connect the rearward or rightward ends of the passages 32 with the rearward or rightward ends of the passages 33 of the intermediate section 28. The passages 39 in the front section 27 are defined by the wall 20 and a wall 42 which is arcuate in cross section and which is generated around the axis A—A. The passages 41 of the rear section 29 are defined by the wall 23 and a wall 43 which is arcuate in cross section and which is generated around the axis A—A. The walls 34, 35, 42, and 43 define a toroid 44 within the toroid 26.

The front section 27 of the toroid 26 is adapted to be rotated or driven about the axis A—A through use of a drive shaft 45 which is bolted to a radial wall 46 which connects to the wall 20 of the front section and likewise forms the front wall of a shell 47 for the rotary parts of the device. A flange 48 projects radially from the wall 20 of the front section 27, and to this flange a wall 49 is bolted, such wall 49 being shaped so as to surround the outer portion of the intermediate section 28 and the rear section 29 of the toroid, so that these sections 28 and 29 may revolve therein. Within the radial wall 46 stiffening ribs 51 may be provided.

The intermediate section 28 has walls 52 radially disposed so as to connect the arcuate walls 34 and 35, and radial webs 53 are provided for the purpose of connecting the wall 22 of the intermediate section 28 with a hub 54 which is mounted on a shaft 55 placed so as to rotate on the axis A—A and so as to extend rightwardly through a tubular wall 56. The leftward end of the shaft 55 engages a bearing 57 carried on the inner face of the radial wall 46 associated with the front section 27. The tubular wall 56 has its inner or leftward end bolted to a hub 58 which is connected to the rear section 29 by use of radial webs 60. Bearings 61 and 62 are provided between the tubular wall 56 and the shaft 55 so that relative rotation of the members 55 and 56 is provided. So that the tubular wall 56 may rotate relative to the casing or shell 47 of the device, a bearing 64 is carried in the inner radial wall 65 of the shell 47.

The rightward or outer end of the shaft 55 projects beyond the rightward end of the tubular member 56, and the rightward ends of the members 55 and 56 are connected together by differential gear means 66 contained in a support 67 which includes a radial wall 68 and a cup-shaped wall 69 bolted thereto. A bearing 71 is provided between the wall 68 and the rightward end of the shaft 55, and a bearing 72 is provided between the member 69 and the tubular wall 56, so that the support 67 of the differential gear means may rotate relative to the members 55 and 56. Idler shafts 73 are carried by the support 67, and on these shafts 73 connected gears 74 and 75 are rotatably mounted. Through gears 76 carried on stub shafts 77, the gears 74 are connected to a gear 78 keyed on the rightward end of the shaft 55. The gears 75 both mesh with a gear 79 which is keyed on the rightward end of the tubular member 56. The differential gear means 66 is connected to a driven member comprising a rightwardly extending shaft 81, by means of machine screws 82. The shell 47 of the device includes a cylindrical wall 83 which projects from the radial wall 65 and cooperates with an end wall 84 to form a housing 85. The end wall 84 carries a bearing 86 which also engages the shaft 81, and the wall 84 also has a stuffing box 87 around the shaft 81 to resist leakage of oil from the shell 47. As a means for relieving gas pressure within the shell 47, a gas discharge passage 88, equipped with a valve means 89, is provided in the shaft 81. The shaft 81 is preferably provided with a brake drum 91 and also a coupling member 92 whereby it may be connected to a part or mechanism which is to be driven.

In the form of my invention, such as disclosed, adapted for rotation in the direction indicated by the arrow 93, the passages 39 of the front section and the passages 41 of the rear section are separated by walls or vanes 94, as shown in Figs. 3 and 6, the outer portions 95 of which vanes are twisted so that these outer portions 95 will lie in helical relation to the axis of rotation A—A. This twist, as shown in Fig. 8, is in what I term "counter-helical" relation to the direction of rotation indicated by the arrow 93a. What I mean by this is that if the direction of rotation of the vanes is anti-clockwise or left-hand, the helix defined by the outer portions 95 of the vanes 94 will be left-hand. The outer vanes 37 of the intermediate member 28 are likewise disposed in counter-helical relation to the direction of rotation indicated by the arrow 93a.

The operation of the device is as follows. Sufficient liquid, such as an oil for example, is placed in the shell 47 to fill the toroid 26 when the shell 47 is rotated. The power device connected to the shaft 45 is then operated so as to revolve the front section 27 in the direction of the arrow 93, with the result that centrifugal force acting in the fluid in the passages 39 of the front section 27 causes such fluid to circulate as indicated by the arrow 100 of Fig. 1. From the outer ends of the passages 39 of the front section 27, the oil is discharged laterally into the passages 32 of the intermediate section 28 as indicated by arrows 101 of Fig. 8. This flow of fluid strikes the vanes 37 of the intermediate section 28 and is deflected into the passages 41 of the rear section 29, as indicated by arrows 102. Each arrow 101 may be considered as representing a force tending to propel the intermediate section 28 forwardly, and each arrow 102 may be assumed to be a force the reaction of which likewise impels the intermediate section 28 in forward rotation. At the same time the force represented by each arrow 102 may tend, during the starting of the device, to rotate the rear section 29 in reverse direction. It must be remembered, however, that there is a frictional drag between the front section 27 and the intermediate section 28 and between the intermediate section 28 and the rear section 29, tending to rotate the sections 28 and 29 forwardly. The rotation of the intermediate section 28 at this time is transmitted through the shaft 55 to the gear 78 at the rearward end thereof, causing this gear 78 to rotate as indicated in Fig. 10. Through the intermediate gears 76, the gears 74 and 75 are rotated in the same direction as the shaft 55, namely, anti-clockwise direction, the result being that the gears 75 tend to rotate the gear 79 in clockwise direction, or if this gear 79 is held substantially stationary or is moving at relatively slow speed, to roll in anti-clockwise direction around or upon the gear 79, thereby turning the differential gear means 66 in anti-clockwise direction. It will be perceived that if the gears 75 are rotating in anti-clockwise direction at the same velocity as the gear 79 is rotated in clockwise direction, the positions of the shafts 77 will not be changed, but as the relative speeds of the gears 75 and 79 are changed, the differential in peripheral velocities of each of these gears 75 and 79 will result in a rotation of the gear means 66 which is termed a "differential rotation".

As the velocity of the intermediate section 28 increases, the flow of fluid from the passages 32 into the outer parts of the passages 41 will be somewhat in the direction of the arrows 106 of Fig. 9, at which time there will be a definite component of force acting against the rear section 29 to rotate the same forwardly or in anti-clockwise direction.

The passages 32, 33, 39, and 41 of the toroid 26 cooperate to provide closed circuits for the circulation of the transmission liquid or oil, which during the operation of the device circulates as indicated by the arrow 100 and arrows 107 and 108 of Figs. 1 and 10. It will be noted that the gears 74 are larger than the gear 78, and that the gear 79 is larger than the gears 75. The relative proportions of the gears 75 to 79 inclusive may be changed for different conditions of operation of the device.

Although in the preferred embodiment of my invention I show the toroid 26 as being formed by the generation of a circular area around an axis lying in its own plane, it is within the meaning of the word "toroid" that an area other than truly circular could be employed. For example, in Fig. 11 I show an area 110 which is nearly square and which when rotated around an axis a—a will produce a toroid 111. This toroid 111 may be divided into front, intermediate, and rear sections 112, 113, and 114, and the passages 32, 33, 39, and 41 of Fig. 1 may be formed therein as indicated at 32', 33', 39', and 41'. It will be seen that the passages 39' and 41' are essentially curved; that is, the ends of these passages are directed laterally instead of in a straight line. In Fig. 1 I have shown the toroid as being of relatively large diameter, but it is recognized that the toroid may be reduced in diameter so that the opening through the center thereof will be very small. For example, in Fig. 11 the toroid 111 is formed by rotation of the area 110 around the axis a—a which is very close to the inner edge 116 of the area 110.

In Figs. 3 and 6 the vanes 94 separating the passages 39 of Fig. 3 and the vanes 94 separating the passages 41 of Fig. 6 are formed so that the outer ends 95 thereof will refine right-hand helixes. In Fig. 7 I show a form of vane 94a which I intend to use in the front section 27 and the rear section 29 of the device when such device is to be used for rotation in either anti-clockwise or clockwise direction.

As shown in Fig. 7, this form of vane 94a will have the outer portions 95a flared so that on one side of each vane 94a there will be an anti-clockwise helical face 120 and on the opposite side thereof there will be a clockwise helical surface 121, the clockwise or right-hand helical surfaces being effective when the power is transmitted to the shaft 45 in anti-clockwise direction, as in Fig. 1, and the anti-clockwise helical faces being effective when the power is transmitted to the shaft 45 in clockwise direction.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. In a fluid transmission of the character described, the combination of: a toroid divided into a front section, an intermediate section, and a rear section, said intermediate section having inner and outer passages from face to face thereof, and said front and rear sections each having curved passages connecting the ends of said passages of said intermediate section, said passages in said sections being separated by walls forming vanes against which the force of a fluid flowing in said passages will act and react to urge said intermediate and rear sections to rotate in the same direction as said front section; drive means connected to said front section of said toroid to rotate said front section on its axis; a driven member mounted so as to be rotatable; an axial shaft connected to said intermediate section of said toroid; a tubular wall rotatably mounted on said shaft, the inner end of said tubular wall being connected to said rear section of said toroid; gears mounted on the outer ends of said shaft and said tubular member; idler gear means connecting said gears in differential relation; and supporting means for said idler gear means, said supporting means being adapted to rotate around said axis of said shaft and being connected to said driven member so that rotary movement imparted to said supporting means by said idler gear means will rotate said driven member at speeds varying with the load thereon with respect to the power load applied at a constant speed to said drive means.

2. In a fluid transmission of the character described, the combination of: a toroid divided into a front section, an intermediate section, and a rear section, said intermediate section having inner and outer passages from face to face thereof, and said front and rear sections each having curved passages connecting the ends of said passages of said intermediate section; drive means connected to said front section of said toroid to rotate said front section on its axis; a driven member mounted so as to be rotatable; an axial shaft connected to said intermediate section of said toroid; a tubular wall rotatably mounted on said shaft, the inner end of said tubular wall being connected to said rear section of said toroid; gears mounted on the outer ends of said shaft and said tubular member; idler gear means connecting said gears in differential relation; and supporting means for said idler gear means, said supporting means being adapted to rotate around said axis of said shaft and being connected to said driven member so that rotary movement imparted to said supporting means by said idler gear means will rotate said driven member at speeds varying with the load thereon with respect to the power load applied at a constant speed to said drive means.

3. In a fluid transmission of the character described, the combination of: a toroid divided into a front section, an intermediate section, and a rear section, said intermediate section having inner and outer passages from face to face thereof, and said front and rear sections each having curved passages connecting the ends of said passages of said intermediate section; a fluid retaining shell enclosing said toroid and being connected so as to rotate with one of said sections of said toroid; drive means connected to said front section of said toroid to rotate said front section on its axis; a driven member extending axially into said shell; a shaft member in said shell connected to said intermediate section so as to be rotated thereby; a shaft member in said shell connected to said rear section so as to be rotated thereby; differential gear means in said shell connecting said shaft members; and means within said shell connecting said differential gear means to said driven member so that the differential movement of said differential gear means will be transmitted to drive said driven member at speeds varying with the load thereon with respect to the power load applied at a constant speed to said drive means.

4. In a fluid transmission of the character described, the combination of: a toroid divided into a front section, an intermediate section, and a rear section, said intermediate section having inner and outer passages from face to face thereof, and said front and rear sections each having curved passages connecting the ends of said passages of said intermediate section; a fluid retaining shell enclosing said toroid and being connected so as to rotate with one of said sections of said toroid; drive means connected to said front section of said toroid to rotate said front section on its axis; a driven member extending axially into said shell; a shaft member in said shell connected to said intermediate section so as to be rotated thereby; a tubular shaft in said shell rotatable on said shaft member, the outer end of said shaft member projecting from the outer end of said tubular shaft; gears mounted on the outer ends of said shaft member and said tubular shaft; idler gear means in said shell connecting said gears; and supporting means for said idler gear means, said supporting means being connected to said driven member so that the differential movement of said idler gear means will be transmitted to drive said driven member at speeds varying with the load thereon with respect to the power load applied at a constant speed to said drive means.

5. In a fluid transmission of the character described, the combination of: a toroid divided into a front section, an intermediate section, and a rear section, said intermediate section having inner and outer passages from face to face thereof, and said front and rear sections each having curved passages connecting the ends of said passages of said intermediate section, said passages in said sections being separated by relatively thin walls forming vanes against which the force of a fluid flowing in said passages will act and react to urge said intermediate and rear sections to rotate, the outer parts of said vanes between said passages of said front section being disposed in planes intersecting at an angle the axis of rotation of the toroid, whereby forces of action and reaction tangential to the toroid are brought to bear on the front and intermediate sections by jets of fluid issuing from and entering said front and intermediate sections respectively, said jets being directed spirally of said axis of rotation by said vanes of said front section; drive means connected to said front section of said toroid to rotate said front section on its axis; a driven rotatable member; a planetary gear system; transmission means connecting said intermediate section to said driven member, comprising one element of said planetary gear system; and transmission means connecting said rear section to the other element of said planetary gear system.

6. In a fluid transmission of the character described, the combination of: a toroid divided into a front section, an intermediate section, and a rear section, said intermediate section having inner and outer passages from face to face thereof, and said front and rear sections each having curved passages connecting the ends of said passages of said intermediate section, said passages in said sections being separated by relatively thin walls forming vanes against which the force of a fluid flowing in said passages will act and react to urge said intermediate and rear sections to rotate, the outer parts of said vanes between said passages of said front and rear sections being disposed in planes intersecting at an angle the axis of rotation of the toroid, whereby forces of action and reaction tangential to the toroid are brought to bear on the said three sections by jets of fluid issuing from and entering said front and rear sections respectively, said jets being directed spirally of said axis of rotation by said vanes of said front and rear sections; drive means connected to said front section of said toroid to rotate said front section on its axis; a driven rotatable member; a planetary gear system; transmission means connecting said intermediate section to said driven member, comprising one element of said planetary gear system; and transmission means connecting said rear section to the other element of said planetary gear system.

7. In a fluid transmission of the character described, the combination of: a toroid divided into a front section, an intermediate section, and a rear section, said intermediate section having inner and outer passages from face to face thereof, and said front and rear sections each having curved passages connecting the ends of said passages of said intermediate section, said passages in said sections being separated by relatively thin walls forming vanes against which the force of a fluid flowing in said passages will act and react to urge said intermediate and rear sections to rotate, the outer parts of said vanes between said passages of said front and rear sections being disposed in planes intersecting at an angle the axis of rotation of the toroid, whereby forces of action and reaction tangential to the toroid are brought to bear on the said three sections by jets of fluid issuing from and entering said front and rear sections respectively, said jets being directed spirally of said axis of rotation by said vanes of said front and rear sections; drive means connected to said front section of said toroid to rotate said front section on its axis; a driven rotatable member; a planetary gear system; transmission means connecting said intermediate section to said driven member, comprising one element of said planetary gear system; and transmission means connecting said rear section to the other element of said planetary gear system, the rear section being free to rotate in either direction except as acted upon by the hydraulic medium and the said other element of said planetary gear system.

BASIL H. ENGLAND.